US00RE35079E

United States Patent [19]

Sverdlin

[11] E Patent Number: Re. 35,079

[45] Reissued Date of Patent: Nov. 7, 1995

[54] FUEL INJECTION SYSTEM FOR INTERNAL COMBUSTION ENGINES

[76] Inventor: Anatoly Sverdlin, 1847 Raintree Cir., Seabrook, Tex. 77586

[21] Appl. No.: 943,687

[22] Filed: Sep. 11, 1992

Related U.S. Patent Documents

Reissue of:

[64] Patent No.: 4,957,085
Issued: Sep. 18, 1990
Appl. No.: 311,626
Filed: Feb. 16, 1989

[51] Int. Cl.[6] ..... F02M 39/00

[52] U.S. Cl. ..... 123/467; 123/41.31; 123/446; 239/533.9

[58] Field of Search ..... 239/533.12, 533.1–533.10, 239/600; 123/467, 446, 447, 41.31

[56] References Cited

U.S. PATENT DOCUMENTS

| | | |
|---|---|---|
| 3,416,506 | 12/1968 | Steiger . |
| 3,722,801 | 3/1973 | Chapuis . |
| 3,767,123 | 10/1973 | Dreisin . |
| 3,945,353 | 3/1976 | Dreisin . |
| 4,005,685 | 2/1977 | Kovacs et al. . |
| 4,069,800 | 1/1978 | Kanda et al. . |
| 4,089,315 | 5/1978 | Lakra . |
| 4,170,974 | 10/1979 | Kopse et al. . |
| 4,249,497 | 2/1981 | Eheim et al. . |
| 4,359,032 | 11/1982 | Ohie . |
| 4,390,129 | 6/1983 | Uchida . |
| 4,403,585 | 9/1983 | Ohie . |
| 4,459,959 | 7/1984 | Terada et al. . |
| 4,706,887 | 11/1987 | Harvey . |
| 4,719,889 | 1/1988 | Amman . |
| 4,830,285 | 5/1989 | Tanaka . |

FOREIGN PATENT DOCUMENTS

| | | |
|---|---|---|
| 0093959 | 5/1984 | Japan . |
| 1406216 | 9/1975 | United Kingdom . |

OTHER PUBLICATIONS

The Motor Ship, "Electronically–Controlled Injection," of M.A.N.—Bosch, Dec. 1979.

*Primary Examiner*—Carl S. Miller
*Attorney, Agent, or Firm*—Bush, Moseley, Riddle & Jackson

[57] ABSTRACT

An improved fuel injector (10) having a needle valve (31) is mounted within a separate removable guide (26) for sliding movement between seated and unseated positions on a valve seat (18). Fuel injector (10) is adapted for operation in a primary fluid control mode (FIG. 5) under the influence of pressurized control fluid in a fluid chamber (30) adjacent the outer end of the needle valve (31), and for alternate operation in a secondary mechanical control mode (FIG. 6) under a mechanical mode spring (96) in the event of a decrease in operating fluid control pressure of the pressurized control fluid below a predetermined minimal amount. Continuous operation of the fuel injector (10) in the alternate operation under the mechanical spring (96) mode is automatic upon the reaching of a predetermined minimum pressure in the operating control fluid. A shutdown system is illustrated in FIG. 7 which overrides both the primary fluid control mode of operation and the secondary mechanical spring mode of operation to hold the needle valve (31) in seated position on its seat (18) under a fluid control pressure when certain engine conditions outside safe operating ranges are sensed. A microprocessor (98) receives input signals from sensors (98A–98H) for sensing various predetermined operating parameters of the engine and provides an output signal to a pressure regulator for controlling the pressure in the control fluid in response to the sensors (98A–98H).

53 Claims, 6 Drawing Sheets

FIG. 1
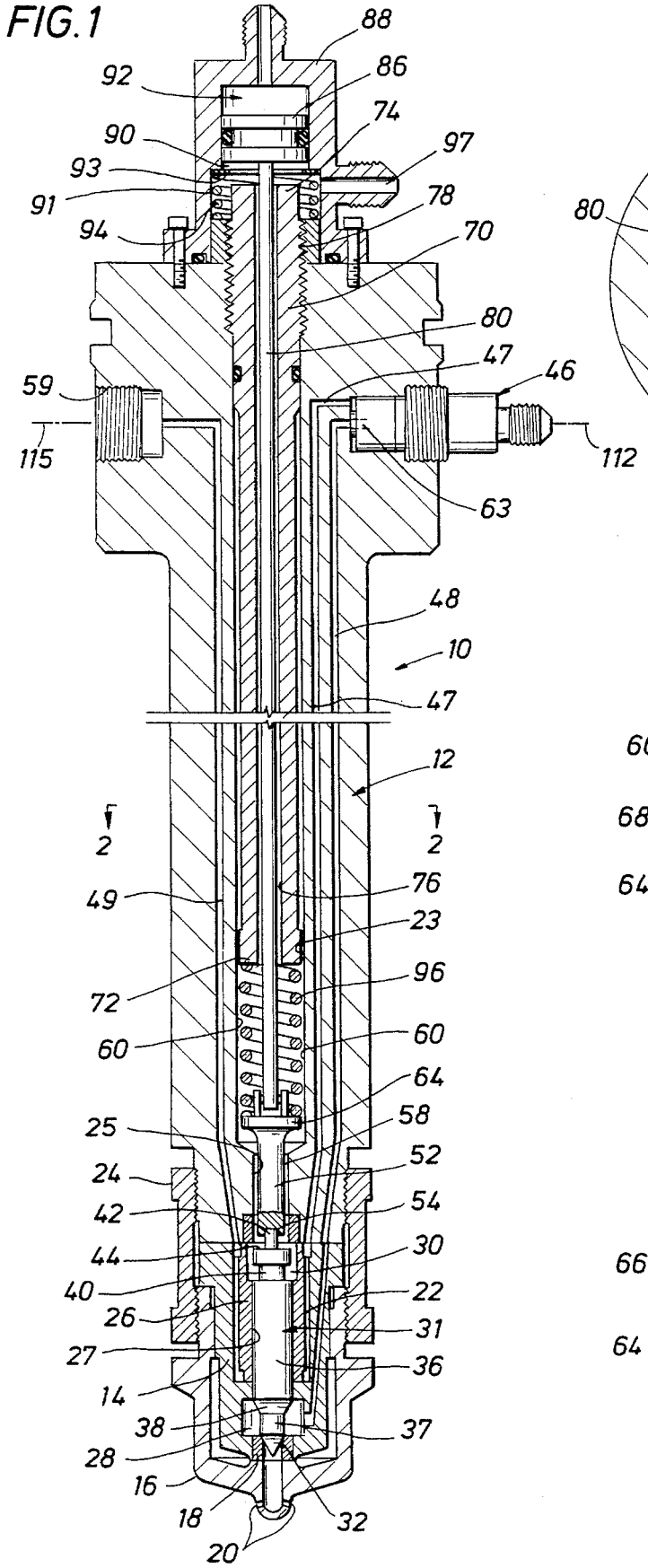
FIG. 2
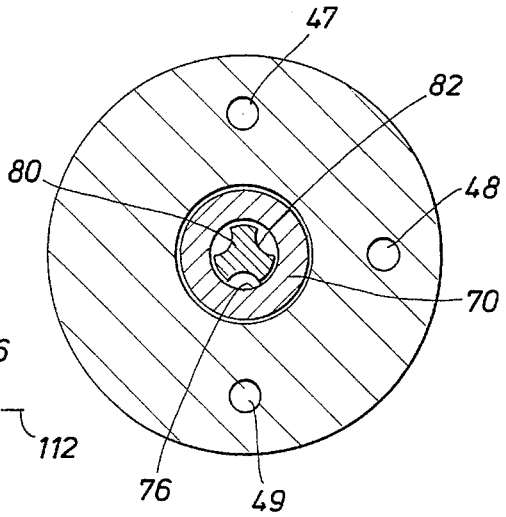
FIG. 3
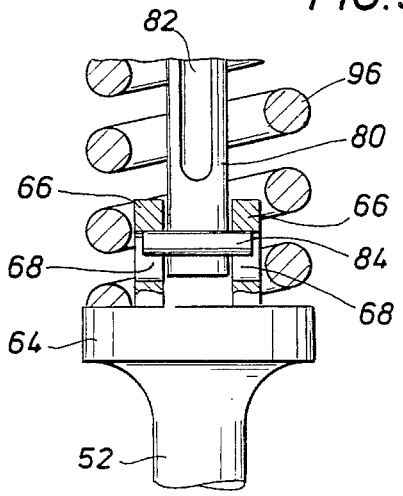
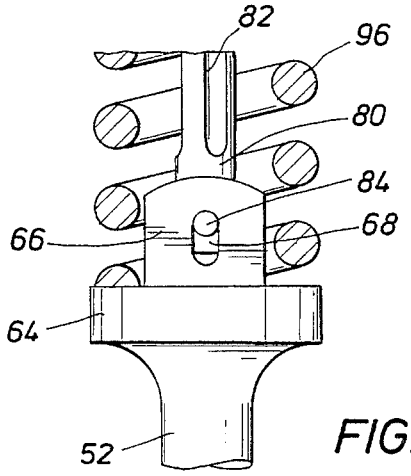
FIG. 4

FIG. 8
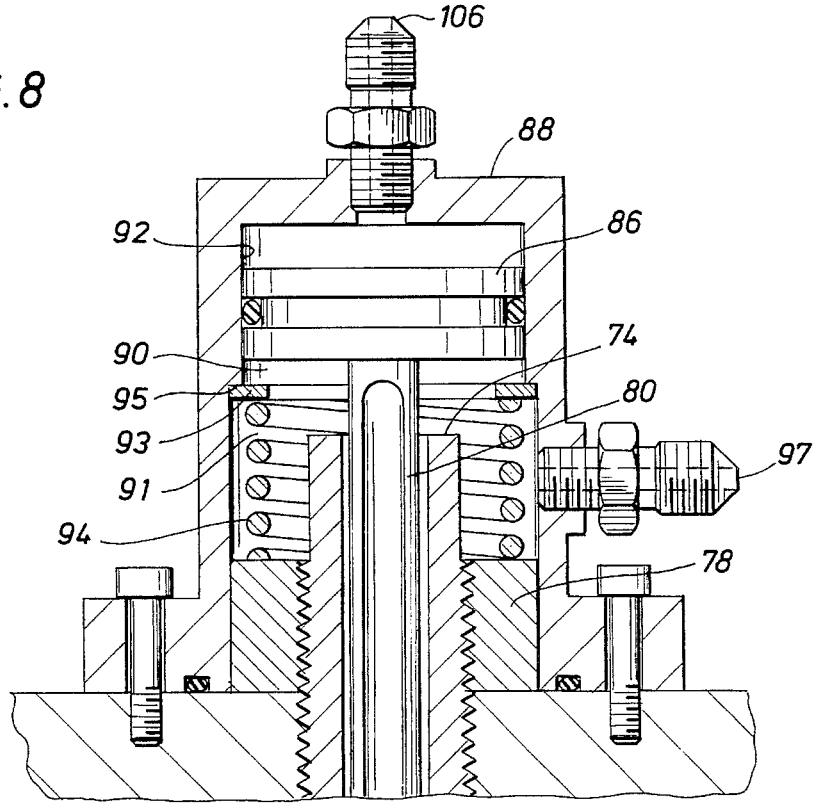
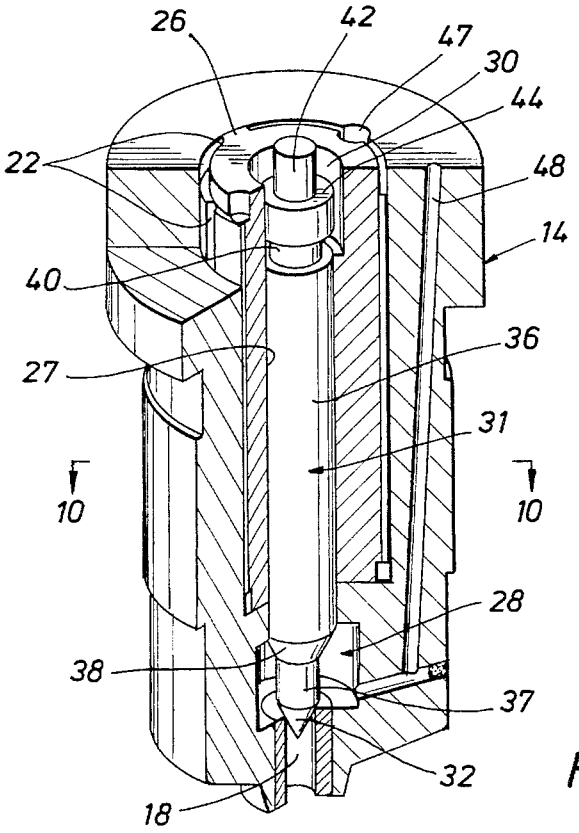
FIG. 10
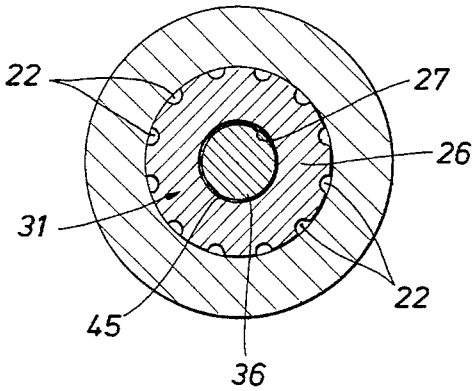
FIG. 9

FUEL INJECTION SYSTEM FOR INTERNAL COMBUSTION ENGINES

Matter enclosed in heavy brackets [ ] appears in the original patent but forms no part of this reissue specification; matter printed in italics indicates the additions made by reissue.

BACKGROUND OF THE INVENTION

This invention relates generally to a fuel injection system for internal combustion engines, and more particularly to a fuel injector for such a system operable normally under the urging of independent mechanical means.

A specific use of the present invention is with diesel engines. Operating on extremely heavy fuels and conventional diesel fuels, the power, efficiency, reliability and economical performance of diesel engines depend upon proper organization of the combustion process in the engine cylinders. One important component of this process is heavy fuel atomization by conventional, closed type of fuel injectors. The control of atomization is largely dependent upon the type of fuel pumps, fuel injectors and combustion chamber configuration. However, the quality of the fuel utilizes in internal combustion engines is not uniform, and the fuel injection equipment must be capable of operation with heavy fuel of poor quality as sometimes might be obtained. It is believed that the substantial majority of diesel engine malfunctions are initiated with an improper combustion process including primarily the failure of fuel pumps, fuel injectors and related equipment. This is accomplished because heavy fuels have unstable molecular structure as a result primarily of poor lubricant ability.

Heretofore, the closed type mechanical fuel injector having a fuel nozzle extending within a cylinder has utilized a spring loaded needle valve with a predetermined clearance and with the spring bias being adjustable for varying the loading on the needle valve. The mechanical components associated with such a fuel injector adversely affect the normal injection process when the components become worn or fatigued, as a result of the molecular structure of the heavy fuels. The vibration of internal parts and the wave effect in the high pressure fuel line from the fuel pump to the injector cause "secondary injection" which results in excessive emissions and carbon deposits on engine parts.

In the present design of the closed type fuel injectors, cavitation occurs very frequently. Existing fuel injection systems utilize different devices to prevent wave effect to avoid "secondary injection", but these systems require a drop in the fuel pressure to almost "zero" in the pressure line which causes cavitation in the fuel pressure lines and the associated fuel pump elements. At the same time it is very difficult to maintain accurate injection timing as viscosity of the fuels, hydraulic losses, elastic expansion of high pressure lines, etc. cause time delay of the fuel injection. All these effects create high exhaust temperatures, high emissions, excessive wear, and premature failure of major engine parts such as pistons, piston rings, valves, cylinder liners, and the like. It is very difficult to maintain identical injection pressures and patterns with a set of injectors using mechanical adjustment controls. It is practically impossible to maintain simultaneous injection timing on the engine with two or more injectors operated from one fuel pump as the injector springs do not have identical tension and the injector with the lesser spring tension opens earlier than the injector with a higher spring tension. Thus, as a result, the injection pattern is irregular and engine parts are often severely damaged. In addition, spring fatigue and needle valve wear have a substantial effect on the timing of injection processes when several injectors from one fuel pump are utilized.

Another major obstacle for proper organization of the combustion process with the closed type mechanical injectors is excessive fuel leakage between the needle valve and guide caused by excessive wear resulting from the poor quality of fuels oftentimes utilized. The lifting speed of the needle valve may be significantly decreased because the force between the spring and the differential pressure of fuel cannot increase fast enough for properly lifting the needle valve, and as a result the injection process in inadequate. Proper injection procedures require the camshaft cams to have a very sharp profile so the fuel pumps inject fuel very fast, but the injectors oftentimes do not react promptly. As a result, certain loads on the cams increase and associated contacting surfaces become fatigued or fractured resulting in engine malfunctioning.

Some hydraulic fuel injection systems heretofore have utilized a fluid control system operable under a predetermined pressure differential between the pressurized fuel and fluid control pressure directly acting on the needle valve. Examples of such prior art systems are shown in United States Pat. Nos. 3,416,506; 4,069,800; and 4,089,315. However, such fuel injection systems have not utilized the physical phenomenon known as a high fluid tension effect to provide a seal between a needle and associated guideway for significantly decreasing the clearance between the needle and guideway. On conventional, mechanically controlled fuel injectors clearances between the needle and guideway are comparatively large, such as 8 to 35 microns, in order to provide adequate free movement of the needle. However, such desirable fluid controlled fuel injection systems have not utilized a backup system in the event of a failure in the fluid control system, such as a rupture of a fluid control line, for example, and this creates a possible potential safety problem since an uninterrupted flow of fuel into the cylinder might occur from the pressurized fuel line.

SUMMARY OF THE INVENTION

The present invention is directed to an improved fuel injector utilized in a fuel injection system for a multi-cylinder internal combustion engine having a pressurized fuel supply source and a fluid control pressure supply source. The improved fuel injector is particularly adapted for use with both extremely heavy fuels and conventional diesel fuels under two separate independent modes of operations with each mode of operation being exclusive of the other mode of operation. The injector has a constant flow of fuel therethrough to prevent solidification of the heavy fuel in the fuel lines and related elements of the fuel system, between delivery strokes of the engine fuel pumps. The injector includes a needle valve mounted for sliding movement within a separately inserted guide or sleeve forming a guideway with the needle valve normally sealed in a closed position on a valve seat adjacent to the fuel nozzle. The guide is cooled by fuel which constantly flows along the outer periphery of the guide for cooling both the guide and needle valve.

A fuel chamber is provided adjacent an inner end of the inserted guide and needle valve near the fuel nozzle, and a fluid control chamber is provided adjacent the opposite end of the inserted guideway and needle valve. The needle valve is open to permit discharge of fuel through the fuel nozzle into the cylinder combustion chamber upon the reaching of a predetermined pressure differential between the pressurized fuel and fluid control pressure, and then reseats upon a subsequent decrease in such pressure differential. Thus, the continual opening and closing of the needle valve result solely from fluid control pressure operation of the needle valve without the influence of any mechanical springs or the like, and is the primary mode of operation of the improved fuel injector comprising the present invention.

Additionally, the fluid control pressure directly over the needle valve provides a seal in the relatively small annular clearance between the needle valve and associated inserted constant flow guideway. Capillary forces exerted in the relatively small annular clearance create a physical phenomenon, known as a "fluid surface tension effect". The needle valve and separate guide are lubricated by high viscosity control fluids, such as lubricating oils. The fluid surface tension effect also centers the needle valve and prevents penetration of heavy contaminated fuel between the needle valve and guideway. The lubricated needle valve and adjacent wall surface of the inserted guide prevent abrasive wear of the precision parts of the fuel injector atomizer and significantly increase the operating life of the injector atomizer; such as a life of 20,000 to 25,000 hours with the present invention as compared with around 3,000 to 5,000 hours with conventional mechanically controlled injectors. As a result, a precise needle valve lifting time and opening time is provided, and the control fluid acts as a shock absorber for the needle valve. Thus, any secondary fuel injection is minimized and cavitation in the fuel pressure lines and associated fuel pump elements is substantially eliminated.

Further, in the event of a decrease in fluid control pressure of the fluid control system, such as a break in a fluid control line, for example, an independent secondary mode of operation takes effect automatically as a backup system and eliminates the possibility of an uncontrollable flow of fuel into the cylinder resulting from the pressurized fuel supply. The independent secondary mode of operation utilizes a mechanical mode spring for providing a seating force against the needle valve, and the mechanical mode spring is maintained in an inoperable position by a fluid control pressure during the primary mode of operation under fluid control pressure. However, upon a decrease of the fluid control pressure to a predetermined minimal amount, the mechanical mode of operation becomes operable automatically to exert a seating force against the needle valve acting against the pressurized fuel. Thus, a fully effective mechanical mode of operation is effective automatically in the event of a malfunctioning in the fluid control supply which renders the fluid control operation mode ineffective. The injector has a continuous constant flow of fuel therethrough and operates with both extremely heavy fuels and conventional diesel fuels.

In addition, a separate independent shutdown system is provided for an emergency stop of the fuel injection process. Suitable sensors provide input signals to a microprocessor for selected engine operating conditions and upon the sensed conditions being outside the predetermined parameters for such conditions, such as overspeeding or lube oil pressure failure, for example, suitable means are activated to supply high pressure control fluid to a piston control mode exerting a shutdown force against the needle valve to hold the needle valve in a closed seated position preventing the uncontrollable supply of fuel to the combustion chambers of the interanal combustion engine.

It is an object of the present invention to provide an improved fuel injector for use in a fuel injection system for a multi-cylinder internal combustion engine operating on heavy fuels to provide a continuous fuel flow during engine operation between delivery strokes of the fuel pump.

It is a further object of this invention to provide such an improved fuel injector which is adapted for use under two independent control modes of operation, one control mode being a primary fluid control mode of operation and the other control mode being a secondary mechanical mode of operation under the influence of a mechanical spring operable only in the event of a decrease in fluid control pressure below a predetermined minimum pressure in the primary fluid control mode.

An additional object of the invention is to provide such an improved fuel injector having a separately inserted fuel cooled sleeve forming a guideway receiving a needle valve for relative sliding movement with a fluid seal in the annular clearance between the needle valve and guideway created by a surface tension effect about the needle valve at all times and cushioning the movement of the needle valve thereby to minimize any undesirable secondary fuel injection and provide a constant flow circulation of heavy fuels between fuel pump delivery strokes.

Another object of the invention is to provide a computer controlled injection system with an analog or digital control for variable injection pressure to vary the fuel injection and fluid control pressures in accord with ambient conditions during engine operation.

An additional object is to provide a separate shutdown system for maintaining the needle valve in closed seated position upon the sensing of certain operating conditions of the engine outside the set predetermined parameters for such conditions.

Other objects and features will be in part apparent and in part pointed out hereinafter.

BRIEF DESCRIPTION OF THE DRAWINGS

FIG. 1 is a longitudinal sectional view of a dual mode fuel injector comprising the present invention for a multi-cylinder internal combustion system and shown in a primary fluid control mode and providing a constant fuel flow between delivery strokes;

FIG. 2 is a transverse sectional view of the fuel injector taken generally along line 2—2 of FIG. 1;

FIG. 3 is an enlarged fragment of FIG. 1 illustrating the connection of the mode control rod to the spindle in the primary control mode under the influence of fluid control pressure to permit an upward movement of the needle valve during the injection stroke;

FIG. 4 is an enlarged fragment similar to FIG. 3 but taken from a position at right angles to FIG. 3;

FIG. 8 is an enlarged sectional view of the mode control cylinder adjacent the outer end of the fuel injector;

FIG. 9 is an isometrical view of the needle valve mounted for relative sliding movement within a separate insert sleeve forming a guideway for the needle valve;

FIG. 10 is a cross sectional view of the needle valve and insert sleeve forming the guideway taken generally along line 10—10 of FIG. 9;

BRIEF DESCRIPTION OF THE INVENTION

Figure 6:
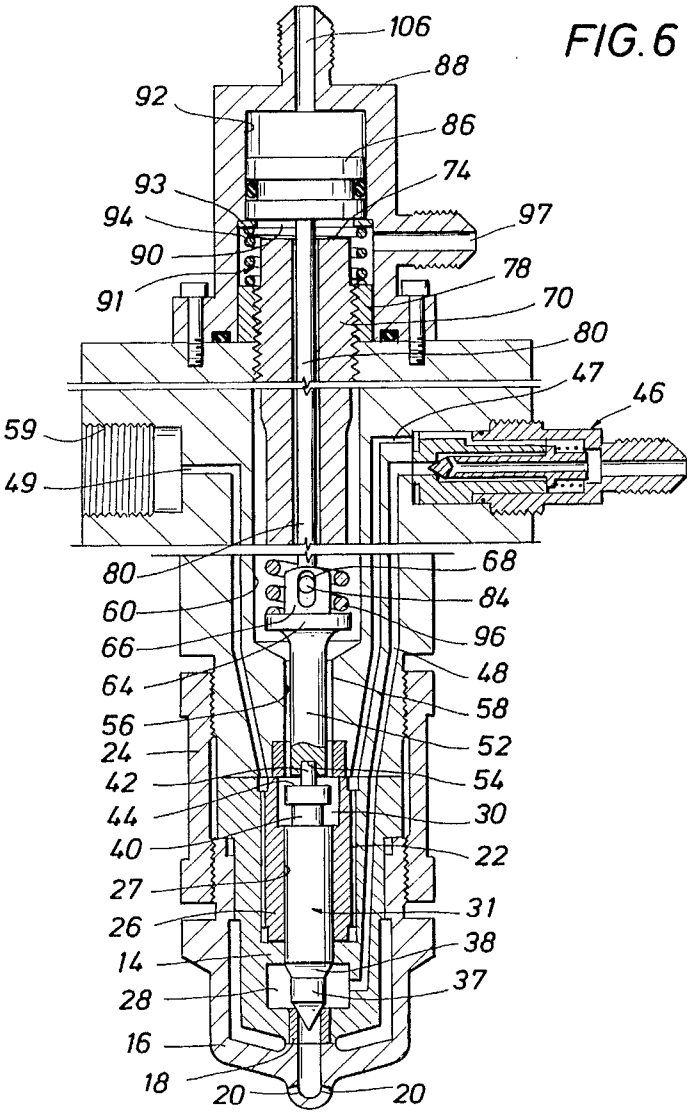
FIG. 6 is an enlarged section similar to FIG. 5 but showing the fuel injector in a secondary mechanical control mode with the primary fluid control mode inoperable from a reduced fluid control pressure and the needle valve under the influence of the mechanical mode spring and providing a constant fuel flow.

Referring now to the drawings for a better understanding of the invention and more particularly to FIG. 1, an improved fuel injector for a multi-cylinder internal combustion engine operating on heavy fuel is shown generally at 10. Fuel injector 10 is particularly adapted for use under two independent control modes of operation, one control mode of operation being a primary control mode of operation under the influence of fluid control pressure, and the other control mode of operation being a secondary mode under the influence of a mechanical spring operable only in the event of a decrease in the operating fluid control pressure below a predetermined minimum control pressure. It is understood that one or several injectors 10 would be provided for each of the cylinders (not shown) of the engine. On both modes the injector provides for a continuous flow of fuel through the injector.

As shown in FIG. 1, injector 10 has an elongate body generally indicated 12 including a needle valve guide carrier or housing illustrated at 14. A nozzle cap 16 fits around needle valve carrier 14 and has a needle valve seat member 18 with nozzle ports 20 for delivery of fuel to an associated cylinder combustion chamber (not shown). A tapered valve seat is formed adjacent the upper end of needle valve seat member 18. A nozzle ring 24 extends about needle valve carrier 14 and nozzle cap 16. A central bore 23 extends through elongate injector body 12 and forms a reduced diameter lower bore portion at 25.

An enlarged diameter fuel chamber 28 is provided adjacent the inner end of a separate needle valve guide or sleeve 26 inserted within needle valve carrier 14 and having a central bore therethrough forming an inner peripheral surface 27 as further illustrated in FIG. 9 and 10. An enlarged diameter fluid control chamber 30 is provided adjacent the outer end of guide 26.

Guide or sleeve 26 has a plurality of circumferentially spaced slots 22 extending longitudinally along its outer peripheral surface for fuel flow and heat exchange purposes. The inner surface 27 of guide 26 serves as a guideway for a fuel needle valve indicated generally at 31. Needle valve 31 has an inner tapered end 32 adapted to seat on valve seat 18 and block fuel flow between fuel chamber 28 and nozzle ports 20. Needle valve 31 has a cylindrical main guide portion 36 mounted within the bore of needle valve guide 26 for slidable reciprocal movement, a small diameter cylindrical differential portion 37 in fuel chamber 28, and a differential surface or frusto-conical portion 38 connecting main guide portion 36 and small diameter portion 37. The differential surface of frusto-conical portion 38 is exposed to pressurized fuel from fuel chamber 28 to urge needle valve 31 upwardly. Cylindrical needle valve 31 has an annular groove 40 adjacent its outer end and a pin 42 projects from the end of needle valve 31 defining an annular fluid differential surface 44 extending about pin 42 along the end of needle valve 31 within fluid control chamber 30. An annular space or clearance indicated at 45 in FIG. 10 is provided between inner peripheral surface 27 of guide 26 and the outer peripheral surface defined by main guide portion 36. Annular clearance 45 is generally uniform along the length of guide 26 and has a width as measured radially between two (2) and five (5) microns. As will be explained further, fluid control pressure from a relatively high viscosity liquid control fluid in annular clearance 45 provides a seal between needle valve 31 and guide 26. Further, capillary forces exerted by such a control fluid provide a fluid surface tension effect which centers needle valve 31 and prevents penetration of heavy contaminated fuel within clearance 45.

Figure 13:
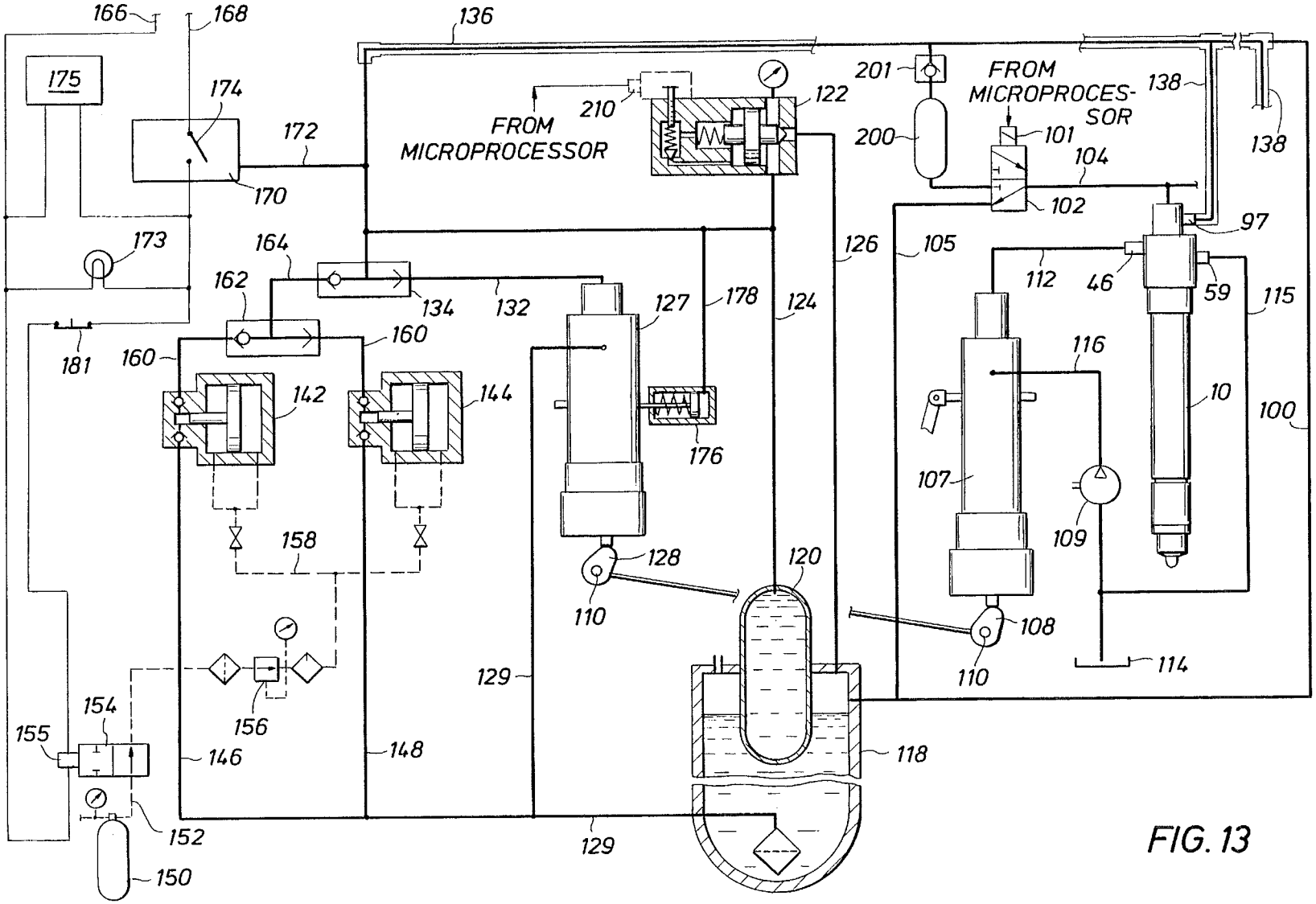
FIG. 13 is a schematic view of the fuel injection system for a multi-cylinder internal combustion engine in which the fuel injector of FIG. 1–11 is utilized.

As shown further in FIGS. 2 and 13, heavy fuel from a main engine driven pump 107 and supply line 112 passes through a constant flow valve unit 46 into injector body 10 to fuel passage 48 which is in fluid communication with fuel chamber 28. Fuel from fuel passage 48 in fluid communication with inner fuel chamber 28 acts against differential surface 38 for urging needle valve 31 upwardly to unseated position for opening of needle valve seat 18 and nozzle ports 20 to permit the supply of heavy fuel from pump 107 through constant flow valve unit 46 into the associated cylinder combustion chamber.

Figure 11:
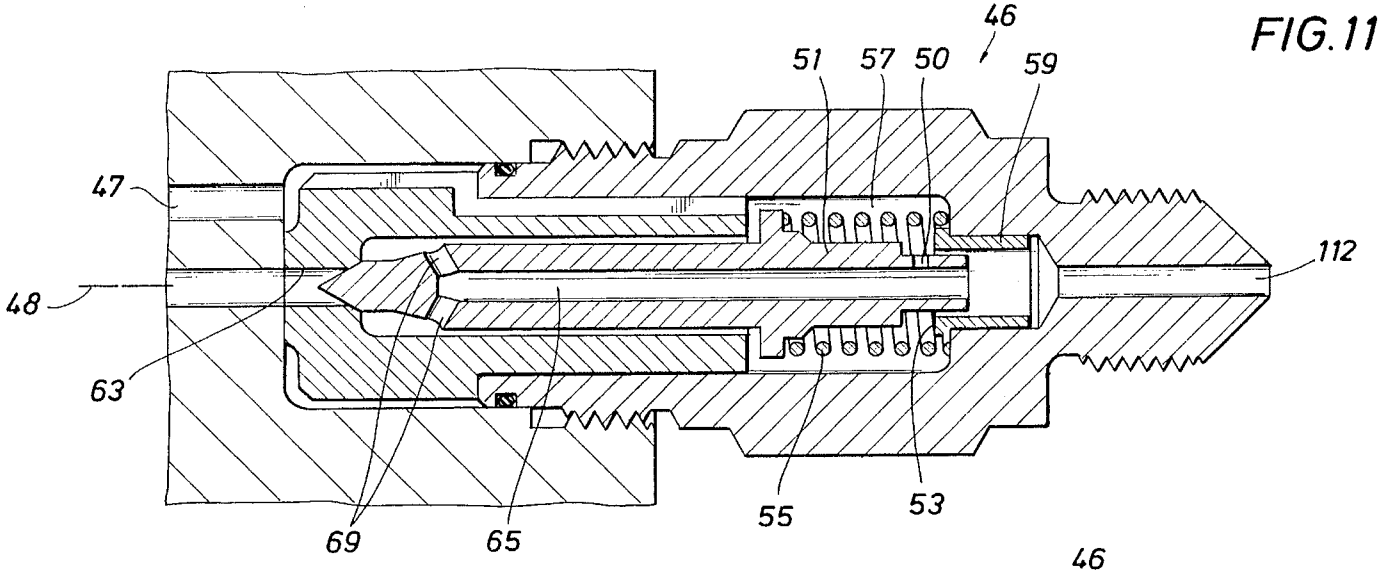
FIG. 11 is an enlarged sectional view of the constant fuel flow valve unit of the present invention for providing a continuous flow of fuel to the injector with the valve member being in a closed position.
Figure 12:
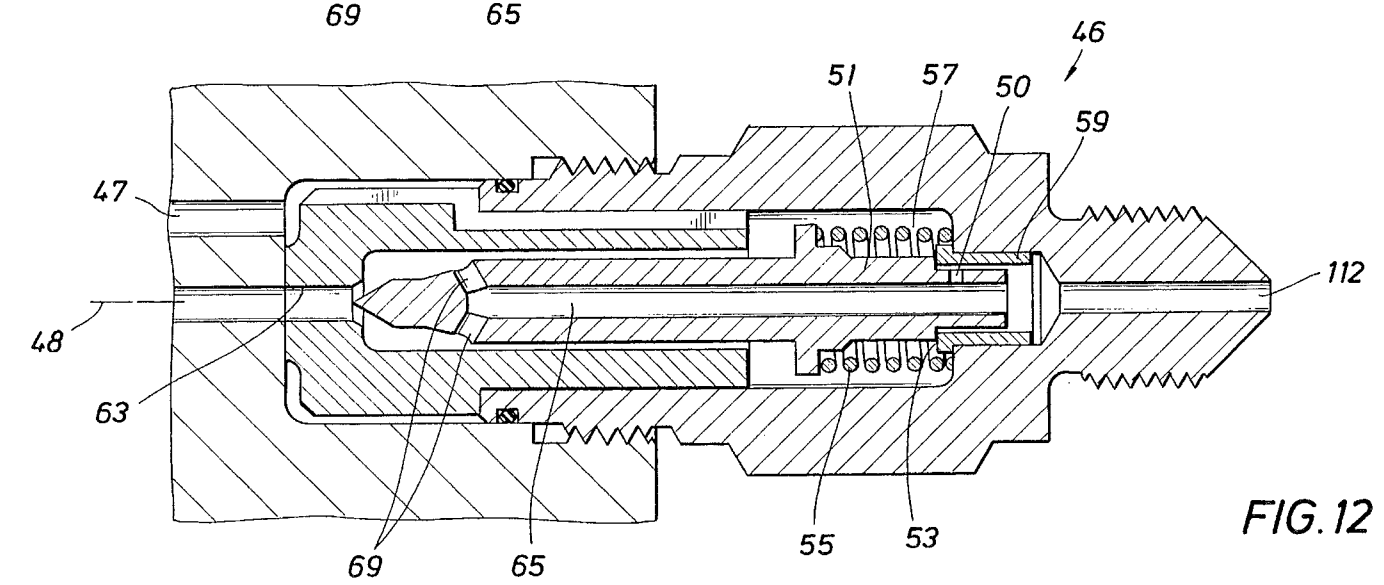
FIG. 12 is an enlarged sectional view of the valve unit of FIG. 11 but showing the valve member in an open position.

The constant flow valve unit 46 as shown particularly in FIGS. 11 and 12 is a commercially available valve unit and serves to provide a constant fuel flow through fuel injector 10 and high pressure supply line 112 from high pressure fuel pump 107 between delivery strokes of fuel pump 107. Constant fuel flow is supported between strokes by booster pump 109 as shown in FIG. 13. A constant fuel flow is desirable in order to prevent solidification of the heavy fuels in fuel line 112 and pump 107 during engine maneuvering and short time stops.

Referring to FIGS. 11 and 12 for operation of the constant fuel flow valve 46 during operation of the associated diesel engine, high pressure pump 107 delivers fuel to the cylinders according to the firing order. Between delivery strokes, fuel does not flow into fuel lines as in conventional injection systems if the injector does not have a continuous flow of fuel through the injector. During engine operation, booster pump 109 circulates fuel under low pressure through constant flow valve 46. A needle 51 of valve unit 46 is urged against an outer seat 53 by spring 55 and heavy fuel flows through port 50 into annular space 57, then through passage 47 to constant flow guide 26, and next along slots 22 to recirculation passage 49 and port 59 to line 115 back to fuel tank 114. Thus, a constant flow of fuel is provided through the injector 10 during operation of the engine. During the fuel delivery stroke of pump 107, the fuel velocity and fluid pressure increase at the port 50. The increased pressure urges needle 51 of the constant flow valve unit 46 toward bushing 59 to the position shown in FIG. 12 and closes port 50 against the upper flat seat of bushing 59. At this position fuel flow from line 112 passes through inner bore 65 of needle 51 and port 69 to passage 48 and fuel chamber 28 for acting against differential surface 38 for lifting needle valve 31 for fuel delivery into the combustion chamber. When fuel delivery is completed, needle 51 closes port 63 against the bias of spring 55 and the constant flow mode repeats a new cycle.

For urging needle valve 31 towards a seated position on seat 18, fluid control pressure is supplied by the control fluid in chamber 30 as will be explained for acting against the annular end 44 of needle valve 31 to urge needle valve 31 to seated position on needle valve seat 18. In addition, the fluid control pressure provides a fluid seal between needle valve 31 and the separately inserted constant flow guide 26 to form a surface tension effect in annular space or clearance 45 between needle valve 31 and inserted constant flow guide 26 as shown in FIG. 10. There is a small clearance provided in annular space 45, such as 2–5 microns as compared with 8–25 microns for conventional mechanically controlled injectors. Thus, in addition to providing a fluid seal, fluid control pressure centers needle valve 31 within constant flow guide 26 and prevents contaminated fuel from penetrating annular space 45 from fuel chamber 28. A suitable liquid fluid which has been found to be satisfactory as a control fluid to provide the fluid control pressure is a lubricating oil for dieselengines, sold under the tradename "Shell Alecsia" by Shell Oil Company and having a specific gravity of 0.905 at a temperature of 98.9° C. with a kinematic viscosity of 19.9. Other suitable liquid fluids having similar qualities will function satisfactory. The control fluid lubricants the opposed surfaces of guide 26 and needle valve 31 and thus prevents excessive wear of guide 26 and needle valve 31 caused by bad quality fuels. The fluid in fluid chamber 30 also serves as a shock absorber for needle valve 31 during the opening thereof and minimizes any wave effect or vibration of needle valve 31 which might result in a secondary fuel injection. The opening of needle valve 31 is provided at a predetermined fluid pressure control force and differential pressure between the pressurized fuel in chamber 28 and the fluid control pressure in chamber 30. Such a predetermined control force also provides a precise needle valve 31 lifting time as well as a precise reseating of needle valve 31 upon a predetermined reduction in the fluid control pressure differential. It is noted that upon wear of needle valve 31 or guide 26, nozzle cap 16 and housing 14 may be easily disassembled to permit replacement of guide 26 or needle valve 31.

Figure 5:
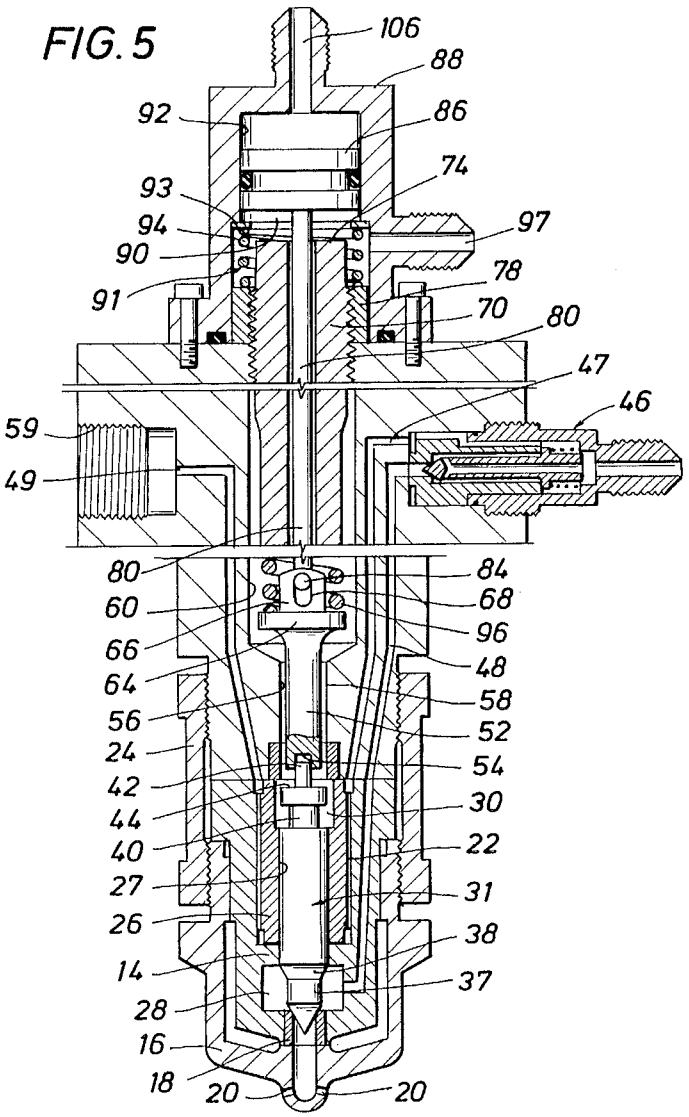
FIG. 5 is an enlarged section of the fuel injector in the primary fluid control mode and providing constant fuel flow but having an intermediate section of the fuel injector removed.

A spindle 52 has an inner end opening 54 which receives the extending end of pin 42 on needle valve 31. As shown in FIG. 1 and 5 in the primary fluid control mode, the outer end of pin 42 is spaced from the closed end of opening 54. Thus, needle valve 31 may unseat and move outwardly to open position relative to spindle 52 in the fluid control mode shown in FIGS. 1 and 5.

Lower bore portion 25 forms a spindle guide or guideway 56 therebetween. Central bore 23 includes an enlarged diameter outer bore portion 60 adjacent spindle guide 56 and an enlarged outer end portion 64 of spindle 52 is received within enlarged bore portion 60. As shown particularly in FIGS. 3 and 4, a pair of spaced lug 66 extend outwardly from end portion 64 and elongate openings 68 are provided in each lug 66.

Mounted in enlarged bore portion 60 is an elongate adjusting screw illustrated generally at 70 having an inner end 72 and an outer end 74 with a control rod bore 76 extending between ends 72 and 74. The outer end portion of screw 70 is externally threaded and an adjusting nut 78 is threaded onto screw 70 for positioning screw 70 within injector body 12.

Adjusting screw 70 receives within bore 76 a mode control rod shown generally at 80. Control rod 80 has longitudinal grooves 82 along its outer surface as shown particularly in FIG. 2 and provides a control fluid passageway through control rod bore 76. A transverse pin 84 is secured to the inner end of mode control rod 80 and fits in elongate slots 68 of lugs 66. As shown in FIGS. 3 and 4 in the primary fluid control mode, pin 84 is positioned at the outer end of slots 68. The outer end of rod 80 has a mode control piston 86 thereon as shown particularly in FIG. 8 mounted in a mode control cylinder 88 to define a lower mode control chamber 90 and an upper shut down chamber 92 on opposed sides of mode control piston 86. Fluid control pressure is provided though inlet 97 to lower chamber 90 of mode control cylinder 88 and is communicated to control fluid chamber 30 through central bore 76 of screw 70 and to spindle guide 56. A spring chamber 91 communicates with mode control chamber 90 and has a diameter larger than the diameter of chamber 90. A shoulder 95 is defined at the juncture of chambers 90 and 91, and a thrust washer 93 is urged against shoulder 95 by mode control spring 94 biased between nut 78 and washer 93.

In the mechanical control mode, piston 86 is seated on thrust washer 93 supported by mode control spring 94. A mechanical mode spring 96 is compressed between the inner end 72 of adjusting screw 70 and the outer end 64 of spindle 52 and fits about lugs 66. Lugs 66 have elongate slots 68 therein. Opening 54 at the inner end of spindle 52 receives pin 42 and forms a lost motion connection between spring 96 and needle valve 31. Spring 96 continuously urges spindle 52 inwardly but mode control rod 80 holds spindle 52 in spaced relation to needle valve 31 in the primary fluid control mode to permit movement of needle valve 31 relative to spindle 52 and spring 96.

Thus, as shown in FIG. 1–5, fuel injector 10 is shown in the primary fluid control mode with fluid in cylinder chamber 90 urging mode control piston 86 upwardly with pin 84 engaged in the outer end of slots 68 to space spindle 52 from pin 42 on needle valve 31. In this position, needle valve 31 moves to unseated open position relative to spring 96 and spindle 52 under the influence of pressurized fuel in fuel chamber 28 for the discharge of fuel into an associated cylinder. Thus, mechanical mode control spring 96 is held in an inoperable position by fluid control pressure in cylinder chamber 90 during operation of fuel injector 10 in the primary fluid control mode.

Referring now to FIG. 6, fuel injector 10 is illustrated in the secondary mechanical mode of operation utilizing mechanical mode spring 96 which is operable only in the event of a reduction of the fluid control pressure below a predetermined minimum such as might occur in the event of a leak or rupture of a fluid control line. Upon a reduction in the fluid control pressure in cylinder chamber 90 below the predetermined minimum, mode control piston 86 moves downwardly. In this position, mode control piston 86 is seated on thrust washer 93 which is supported by mode control spring 94 as shown in FIG. 6. Pin 42 of needle valve 31 engages spindle 52 at end opening 54 with pin 84 on the end of mode control rod 80 being positioned intermediate the ends of elongate slots 68 on lugs 66. Mechanical mode control spring 96 and spindle 52 continuously urge needle vale 31 toward seated position. Needle valve 31 unseats under the influence of pressurized fuel in fuel chamber 28 against the influence of compression spring 96 and is reseated under the influence of spring 96 upon the reduction of fuel pressure. Thus, fuel injector 10 operates in the same manner under the influence of mechanical mode control spring 96 as in the primary mode of operation under fluid control pressure as illustrated in FIGS. 1–5.

Figure 7:
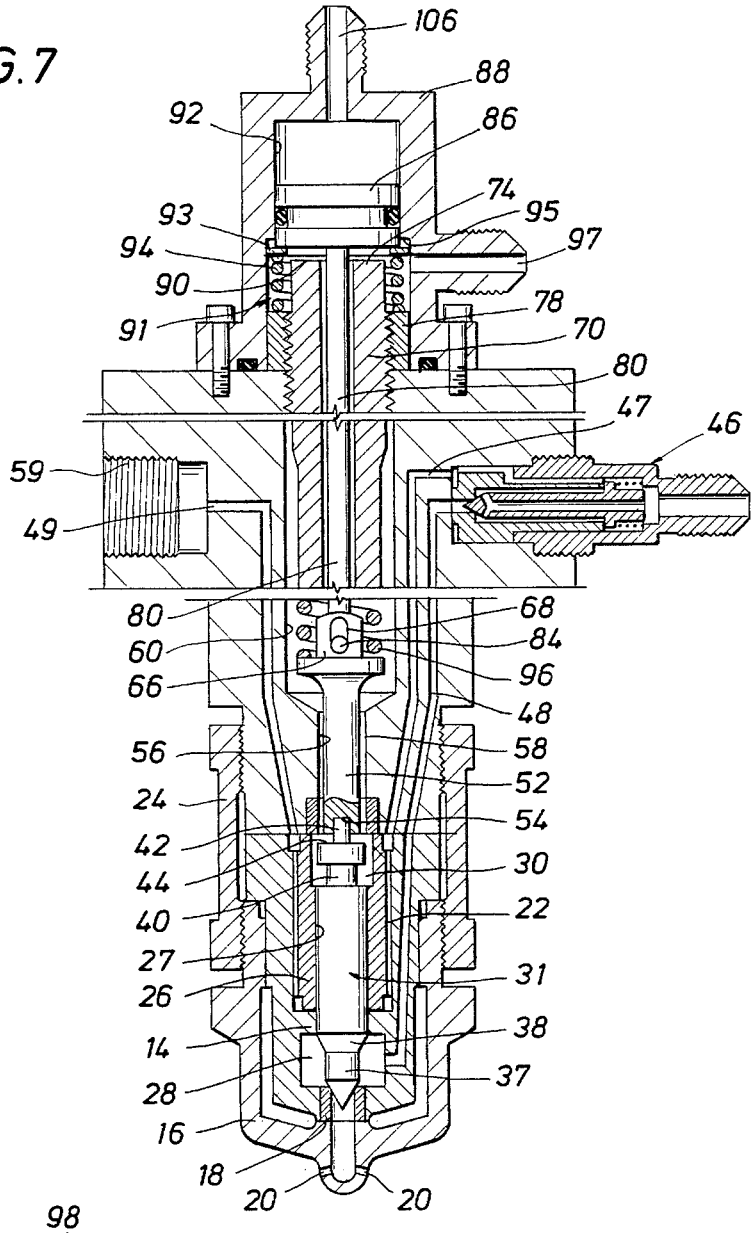
FIG. 7 is an enlarged section similar to FIGS. 5 and 6 but showing the fuel injector in an emergency shut-down position with the needle valve held in a closed position by the mode control piston.
Figure 14:
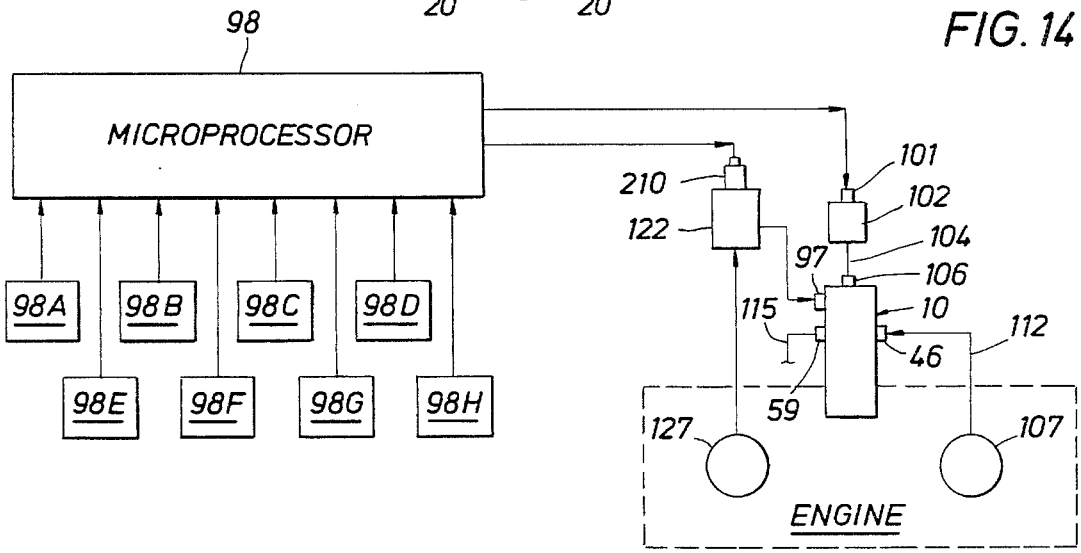
FIG. 14 is a schematic view of the microprocessor and associated sensors for predetermined engine functions to provide optimum fluid control pressure signals to the control system of FIG. 13 for varying injection pressure in response to ambient conditions during engine operation.

Referring now to FIG. 7, a shutdown position of fuel injector 10 is illustrated in which piston 86 and mode control rod 80 are shown for holding needle valve 31 in seated closed position on valve seat 18 to prevent the discharge of fuel from fuel injector 10. Also, thrust washer 93 is unseated from shoulder 95 by contact with piston 86 and compresses spring 94. Selected operating parameters of the engine may be sensed with sensor signals and transmitted to a microprocessor 98 as shown in FIGS. 13 and 14. Upon certain operating conditions being outside the set parameters to indicate a possible dangerous operating condition for the engine, microprocessor 98 actuates a solenoid 101 for moving valve 102 connected to a source of high pressure fluid to an open position to supply high pressure fluid through line 104 to inlet 106 for outer cylinder chamber 92. Mode control piston 86 and mode control rod 80 are then moved downwardly, as shown in FIG. 7. At this position mode control piston 86 which has been seated on thrust washer 93, compresses mode control spring 94 and moves mode control rod 80 to the position of FIG. 7 with pin 84 engaged in the inner end of elongate slots 68 of lugs 66 to urge spindle 52 against pin 42 of needle valve 31 to hold needle valve 31 in seated position under the high fluid control pressure in upper chamber 92 of the mode control cylinder 88.

Referring to FIG. 13, the fuel injection system for operation of fuel injector 10 is shown schematically. For supplying fuel to one or several fuel injectors 10, a main engine driven fuel pump is shown at 107 and is operated from a cam 108 connected to an engine cam shaft 110. High pressure fuel is transmitted to fuel chamber 28 through high pressure fuel line 112, constant flow valve 46 and passageway 48. A suitable fuel reservoir or tank is shown at 114 for the supply for fuel from booster pump 109 through line 116 to the high pressure main engine driven fuel pump 107.

For operation of fuel injector 10 under the primary fluid control mode, a fluid reservoir is shown at 118 having an accumulator 120 connected to a pressure regulator 122 through line 124 with a fluid return line 126 to reservoir 118. A fluid control pump 127 is driven by cam 128 on engine camshaft 110 and is connected to fluid reservoir 118 through line 129 for pumping control fluid through line 132, shuttle valve 134, main fluid control manifold 136, and branch control line 138 to injector 10. Line 138 is connected to inlet 97 for lower chamber 90 of the mode control cylinder 88. From inlet 97 fluid control pressure passes through control rod bore 76 around control rod 80 to fluid control chamber 30 and chamber 90 for actuating needle valve 31 and mode control piston 86 as shown in FIGS. 1 and 5.

A double wall manifold is shown schematically at 136 and a separate branch line 138 is provided therefrom to the fuel injector for each cylinder as well known. The fluid control pressure in manifold 136 and lines 138 is maintained by fluid control pump 127, accumulator 120, and pressure regulator 122.

For providing fluid control pressure to fuel injector 10 prior to start up of the engine and to provide a backup, a separate means for supplying fluid control pressure to fuel injector 10 in the event of a malfunctioning of main engine drive fluid pump 127, air driven fluid pumps 142 and 144 are provide in branch fluid lines 146 and 148 connected to main supply line 129. Air pump 144 may act as a back up pump for air pump 142. An air pressure source 150 has a line 152 leading to a two-way normally open valve 154 operated by a solenoid 155 and maintained in an open position in the primary fluid control mode of operation for supplying air through an air control unit generally designated 156 and line 158 therefrom to pumps 142 and 144. Lines 160 from pumps 142, 144, lead to shuttle valve 162 for supplying control fluid alternately through shuttle valve 162 to line 164 and shuttle valve 134. When engine driven fluid control pump 127 is inoperable and fluid control pressure is not being supplied from pump 127, shuttle valve 134 moves to a position to receive control fluid from line 164 for supplying control fluid through double wall manifold 136 and branch line 138 to injector 10. Upon malfunctioning of pump 127 shuttle valve 134 moves automatically to a position for the supply of control fluid by pumps 142 and 144.

To determine the amount of fluid control pressure in fluid control pressure chamber 30 adjacent the upper end of needle valve 31, the flowing formula is utilized:

$$P_c = P_b\left[1-\left(\frac{d_1}{d}\right)^2\right]$$

wherein $P_c$=the pressure in psi of the control fluid in chamber 30;

$P_b$=the pressure in psi of the fuel in fuel chamber 28 for opening of needle valve 31;

d=outer diameter in inches of body portion 36 of needle valve 31; and $d_1$=inside diameter in inches of valve seat 18 at its outer end in engagement with needle valve 31.

The force exerted on needle valve 31 from compressed mechanical mode spring 96 in the secondary mechanical control mode is equal to the force exerted against needle valve 31 from fluid control pressure in chamber 30 and such force is equal to the recommended fuel pressure for the initial opening of needle vale 31. It is noted that fluid accumulator 120 dampens the fluid pressure pulses from pump 127 and needle valve 31. The fluid control pressure may be accomplished automatically by means of pressure regulator 122 if desired. While lubricating oil for diesel engines has been illustrated as a suitable control fluid for operation of fuel injector 10, it is to be understood that other suitable fluids may be provided, if desired. If control pressure line 138 of manifold 136 malfunctions such as a leakage occurring, control fluid will be suspended below in double wall of the manifold 136 and return through line 100 to tank 118.

An emergency alarm and/or shut down electrical system as shown in FIG. 13 is utilized for operation of the injector system in the secondary mode of operation in which the fluid control pressure is reduced below a predetermined minimal amount. Electrical lines 166 and 168 are connected to a suitable source of electrical energy. A pressostat shown at 170 senses the fluid control pressure in double wall manifold 136 through sensing line 172 and has a normally open switch 174.

Upon the reduction of fluid control pressure below a predetermined minimum, switch 174 closes to energize an emergency light 173 and to energize an audio visual alarm 175 on a control panel to inform the operator of a failure in the fluid control mode. Solenoid 155 is energized upon closing of switch 174 to close valve 154 and deactivate air fluid pumps 142 and 144. Also, a servomotor 176 for engine driven fluid control pump 127 is connected by line 178 to manifold supply line 136. Upon a reduction in fluid control pressure in line 178, servomotor 176 is activated and switches fluid control pump 127 to a bypass mode. At this time, the fluid control mode operation of fuel injector 10 is out of operation. To energize air pumps 142 and 144 after being de-energized, a push button 181 is opened to de-energize solenoid 155 for return of valve 154 to an open position for supply of air to pumps 142, 144.

Upon a reduction in the fluid control pressure in cylinder mode control chamber 90, mode control piston 86 engages thrust washer 93 and mode control rod 80 with pin 84 moving the position shown in FIG. 6. Pin 84 is positioned at an intermediate location in elongate slots 68 of lugs 66, and spindle 52 engages the upper end of pin 42 thereby to urge needle valve 31 into closed down position on seat 18 under the influence of mechanical mode spring 96 acting against spindle 52. In this manner, the operation of the fuel injection system continues under the influence of mechanical mode spring 96. Thus, upon a reduction in the fluid control pressure, the mechanical system automatically switches to the secondary mechanical control mode without any manual steps required, and the engine may operate continuously thereafter without interruption and without any safety hazards. While a needle valve 31 has been illustrated in the drawings, it is to be understood that various other types of reciprocal valve members could be employed in a satisfactory manner.

Referring to FIG. 14, input signals are transmitted from sensors 98A, 98B, 98C, 98D, 98E, 98F, 98G, and 98H to microprocessor 98. Sensors 98A–98H sense various operating conditions or functions of the diesel engine as follows:

| Sensor | Engine Operating Condition |
|---|---|
| 98A | Direction of crankshaft rotation |
| 98B | Load on crankshaft |
| 98C | Crankshaft angle |
| 98D | Air intake pressure |
| 98E | Air intake temperature |
| 98F | Exhaust gas temperature |
| 98G | Combustion chamber temperature |
| 99H | Rotational speed of crankshaft |

Safe operating parameters or ranges have been predetermined for each of the above conditions and when microprocessor 98 senses a conditions and when microprocessor 98 senses a condition outside the safe operating range, injector 10 will be moved to a shutin position by an output signal transmitted from microprocessor 98 for energizing solenoid 101. An accumulator 200 is connected between manifold 136 and valve 102 with a non-return valve 201 adjacent manifold 136. Upon energizing of solenoid 101 for valve 102 accumulator 200 supplies fluid through valve 102 and line 104 to cylinder chamber 92.

It is noted that the shutdown system illustrated in FIG. 13 is operable at all times both during the operation of the primary fluid control mode and the secondary mechanical spring mode. The fluid control pressure from fluid accumulator 200 for valve 102 is substantially higher than the pressure of the control fluid in the fluid control mode. Thus, the system of FIG. 13 will override the primary fluid control mode and the mode control spring 96 for immediately shutting down the fuel injection process.

Further, microprocessor 98 controls the operating pressure of the control fluid from the signals transmitted from sensors 98A–98H, by transmitting an output signal to a converter 210 for pressure regulator 122 as shown in FIG. 13. Converter 210 converts the electrical input signal to a fluid signal for regulator 122 for varying the pressure of the control fluid in response to the conditions sensed by sensors 98A–98H. Thus, the pressure of the control fluid supplied through line 138 to fluid control chamber 30 may be varied by microprocessor 98. As an example of the operating pressure for the diesel fuel and control fluid in a Sulzer type 9RLB90 diesel engine, manufactured by Sulzer Brothers, Limited, Winterthur, Switzerland, the diesel fuel pressure is around 250–280 $KG/cm^2$ while the control fluid utilizing a lubricating oil is around 180 $KG/cm^2$.

The advantages of such a fuel injection system as set forth above are several with some of the major advantages being improved fuel combustion resulting primarily from the minimizing of any secondary fuel injection and in the improved combustion process resulting from a precise closing and opening of the needle valve. Further, the fluid seal between the needle valve and its associated inserted guide creates a fluid surface tension effect between the needle valve and the guideway to block any fuel penetration. Additionally, the control fluid acting as a shock absorber during opening of the needle valve to minimize any wave effects or vibrations of the needle valve. It is noted that exhaust temperatures and emissions (particularly on partial loads) from diesel engines utilizing the present system have been reduced substantially while utilizing a generally uniform combustion pressure and a relatively smooth main engine operation.

The multiple fuel injectors utilized for multiple cylinders operate from a single fuel pump and the fuel may be atomized simultaneously. Secondary fuel injection and cavitation of the associated fuel pumps is minimized thereby increasing the operating life of the various operating elements while the fluid seal between needle valve 31 and guide 26 minimizes wear of the injector parts. It is further pointed out that fuel injector 10 may be utilized with existing fuel injection systems for diesel engines without any substantial modifications of such systems. The minimizing or elimination of any secondary fuel injection decreases fuel consumption and substantially increases the operating life of fuel injector atomizers.

In view of the above it will be seen that the several objects of the invention are achieved and other advantageous results obtained.

As various changes could be made in the above constructions without imparting from the scope of the invention, it is intended that all matter contained in the above description and shown in the accompanying drawings shall be interpreted as illustrative and not in a limiting sense.

What is claimed is:

1. An improved fuel injector adapted for use with a fuel injection system for a multi-cylinder internal combustion engine including a control fluid pressure source and a pressurized fuel source, said fuel injector comprising:

an elongate body having a bore therein;

a fuel nozzle at an inner end of said body for projecting within an associated cylinder combustion chamber for delivery of fuel therein, a fuel chamber adjacent the fuel nozzle and having pressurized fuel therein, and a valve seat between the fuel nozzle and fuel chamber;

a valve mounted within said bore on said valve seat and movable between open and closed positions relative to said valve seat and said nozzle, said valve being in communication with pressurized fuel in said fuel chamber and urged toward an open unseated position by said pressurized fuel for providing fuel to said nozzle for discharge into an associated cylinder;

a pressurized control fluid chamber in said body adjacent said valve and having pressurized control fluid therein for urging said valve toward a closed seated position on said valve seat to block the flow of fuel to said nozzle under a primary fluid control mode of operation;

a mechanical mode spring in said body operable upon the decrease in pressure of said control fluid below a predetermined minimum amount for urging said valve toward a seated closed position on said valve seat, said mechanical mode spring comprising a compression spring acting against the outer end of said valve for urging said valve toward a seated position; and means to maintain said mechanical mode spring in an inoperable position during the primary fluid control mode of operation;

said bore of said body including a guideway in which said valve is mounted for longitudinal movement between seated and unseated positions relative to said valve seat, said control fluid chamber being positioned adjacent the outer end of said guideway with pressurized control fluid therein providing a fluid seal between said valve and said guideway, and cushioning the movement of said valve to an unseated open position.

2. An improved fuel injector adapted for use with a fuel injection system for a multi-cylinder internal combustion engine including a control fluid pressure source and a pressurized fuel source; said fuel injector comprising:

an elongate body having a bore therein;

a fuel nozzle at an inner end of said body for projecting within an associated cylinder combustion chamber for delivery of fuel therein, a fuel chamber adjacent the fuel nozzle and having pressurized fuel therein, and a valve seat between the fuel nozzle and fuel chamber;

a valve mounted within said bore on said valve seat and movable between open and closed positions relative to said valve seat and said nozzle, said valve being in fluid communication with pressurized fuel in said fuel chamber and urged toward an open unseated position by said pressurized fuel for providing fuel to said nozzle for discharge into an associated cylinder;

a control fluid chamber in said body adjacent said valve and having pressurized control fluid therein for urging said valve toward a closed seated position on said valve seat to block the flow of fuel to said nozzle under a primary fluid control mode of operation;

a mechanical mode spring in said body operable upon the decrease in pressure of said control fluid below a predetermined minimum amount for urging said valve toward a seated closed position on said valve seat, said mechanical mode spring comprising a compression spring acting against the outer end of said valve for urging said valve toward a seated position;

means for maintain said mechanical mode spring in an inoperable position during the primary fluid control mode of operation; and spring retaining means for holding said compression spring in an inoperable position during operation of said fuel injector in the fluid control mode, said spring retaining means and said compression spring being activated upon the reduction of said fluid control pressure to a predetermined amount to permit said compression spring to urge said valve toward seated position.

3. An improved fuel injection system for a cylinder of an internal combustion engine comprising:

a fuel injector having a fuel discharge nozzle adjacent an end thereof for discharge of fuel into the cylinder and adapted to be operated under the influence of a pressurized control fluid in a primary mode of operation and alternatively under the influence of a mechanical mode spring in a secondary mode of operation when the pressurized control fluid reaches a predetermined minimal amount, said fuel injector having an elongate body and a needle valve guide carrier adjacent the inner end of said body receiving a removable sleeve to define a guideway;

a valve in said injector movable between an open position to permit fuel flow to the nozzle and a closed position to block fuel flow through the nozzle, said valve comprising a needle valve mounted within said sleeve and defining an annular clearance between said needle valve and sleeve of a radial thickness around 2–5 microns;

means to supply pressurized fuel to said valve to urge said valve toward an open position for supply of fuel to said nozzle;

means to supply pressurized control fluid to said valve to urge said valve toward a closed position against the urging of said fuel, said valve moving to open position upon a reaching of a predetermined pressure differential between said pressurized fuel and said pressurized control fluid;

a mechanical mode spring mounted in said fuel injector for selectively acting against said valve for urging said valve to a closed position against the urging of said pressurized fuel; and means for maintaining said mechanical mode spring in an inoperable position during operation of said injector in the primary mode of operation when said fluid control pressure is above a predetermined minimum amount, said maintaining means being responsive to a decrease in control fluid pressure below a predetermined minimum to activate said mechanical mode spring for acting against said valve to urge said valve toward a closed position against the urging of said pressurized fuel.

4. An improved fuel injection system for a cylinder of an internal combustion engine comprising:

a fuel injector having a fuel discharge nozzle adjacent an end thereof for discharge of fuel into the cylinder and adapted to be operated under the influence of a pressurized control fluid in a primary mode of operation and alternatively under the influence of a mechanical mode spring in a secondary mode of operation when the pressurized control fluid reaches a predetermined minimal amount;

a valve in said injector movable between an open position to permit fuel flow to the nozzle and a closed position to block fuel flow to the nozzle;

means to supply pressurized fuel to said valve to urge said valve toward an open position for supply of fuel to said nozzle;

means to supply pressurized control fluid to said valve to urge said valve toward a closed position against the urging of said fuel, said valve moving to open position upon a reaching of a predetermined pressure differential between said pressurized fuel and said pressurized control fluid;

a mechanical mode spring mounted in said fuel injector for selectively acting against said valve for urging said valve to a closed position against the urging of said pressurized fuel; and means for maintaining said mechanical mode spring in an inoperable position during operation of said injector in the primary mode of operation when said fluid control pressure is above a predetermined minimum amount, said maintaining means being responsive to a decrease in control fluid pressure below a predetermined minimum to activate said mechanical mode spring for acting against said valve to urge said valve toward a closed position against the urging of said pressurized fuel;

said valve being mounted for sliding movement between open and closed positions relative to said nozzle and said fuel injector having an elongate guideway receiving said valve with pressurized fuel being supplied adjacent one end of said guideway and fluid control pressure being supplied adjacent the opposite end of said guideway, the control fluid pressure forming a seal between the valve and guideway.

5. An improved fuel injection system for a cylinder of an internal combustion engine comprising:

a fuel injector having an elongate body with a bore therein and a fuel discharge nozzle adjacent an end of the body for discharge of fuel into the cylinder, said fuel injector adapted to be operated under the influence of a pressurized control fluid in a primary mode of operation and alternatively under the influence of a mechanical mode spring in a secondary mode of operation when the pressurized control fluid reaches a predetermined minimal amount;

a valve in said injector movable between an open position to permit fuel flow to the nozzle and a closed position to block fuel flow to the nozzle;

means to supply pressurized fuel to said valve to urge said valve toward an open position for supply of fuel to said nozzle;

means to supply pressurized control fluid to said valve to urge said valve toward a close position against the urging of said fluid, said valve moving to open position upon a reaching of a predetermined pressure differential between said pressurized fuel and said pressurized control fluid;

a mechanical mode spring mounted in said fuel injector for selectively acting against said valve for urging said valve to a closed position against the urging of said pressurized fuel;

means for maintaining said mechanical mode spring in an inoperable position during operation of said injector in the primary mode of operation when said fluid control pressure is above a predetermined minimum amount, said maintaining means being responsive to a decrease in control fluid pressure below a predetermined minimum to active said mechanical mode spring for acting against said valve to urge said valve toward a closed position against the urging of said pressurized fuel, said maintaining means including a mode control piston mounted within said bore of said injector body and responsive to said control fluid pressure;

a mode control rod extending from said mode control piston operatively connected to said mechanical mode spring; and a lost motion connection extending between said valve and said mechanical mode spring to permit opening and closing of said valve relative to said compression spring in the primary mode of operation under the influence of fluid control pressure.

6. An improved fuel injection system for a multi-cylinder internal combustion engine comprising:

a fuel injector having an elongate body with a bore therein defining a guideway, a fuel chamber adjacent the inner end of said guideway, and a pressurized control fluid chamber adjacent the outer end of said guideway;

a fuel discharge nozzle adjacent the inner end of said elongate body and in communication with said fuel chamber, a valve seat between the fuel chamber and said fuel discharge nozzle, and a valve mounted within said guideway for reciprocal movement between seated closed position and unseated open position relative to said valve seat;

a main pressurized control fluid supply line extending to said injector and said control fluid chamber;

a fuel pump in fluid communication with said fuel chamber for supplying pressurized fuel to said fuel chamber;

an engine driven control fluid pump in fluid communication with said main control fluid supply line for supplying pressurized control fluid to said control fluid chamber;

said valve having its inner end exposed to pressurized fuel in said fuel chamber and its outer end exposed to pressurized control fluid in said control fluid chamber for unseating of said valve upon the reaching of a predetermined fluid control pressure differential between said pressurized fuel and said pressurized control fluid for operation of said fuel injector under a primary fluid control mode;

a mechanical mode compression spring mounted within the bore of said fuel injector body for selectively acting against said valve for urging said valve to seated position on said valve seat;

means for selectively maintaining said mechanical mode spring in an operable position during operation of said injector under said primary fluid control mode, said maintaining means responsive to a decrease in control fluid pressure operating below a predetermined minimum to activate said mechanical mode spring for urging said valve toward a seated position on said valve seat against the urging of said pressurized fuel for providing a secondary mechanical mode of operation for said fuel injector;

a spindle mounted between the outer end of said valve and the inner end of said compression spring with said spring urging said spindle toward said valve;

a mode control piston responsive to control fluid pressure mounted within said body bore and having a mode control rod secured thereto and extending to said spindle; and a lost motion connection between the inner end of said mode control rod and the outer end of said spindle whereby upon a predetermined operating control fluid pressure being exerted against a side of said mode control piston, said spindle is maintained out of contact with said valve to permit independent operation of said valve under the primary control mode of operation.

7. In a fuel injection system for a multi-cylinder internal combustion engine; an improved fuel injector comprising:

an elongate body having a needle valve guide carrier adjacent an end thereof defining a needle valve seat and a fuel chamber adjacent the needle valve seat;

a guide sleeve mounted within said guide carrier and defining a central guideway therein positioned adjacent said fuel chamber, said sleeve being removable from said guide carrier, said guide carrier having a central bore receiving said sleeve with a fuel passageway defined between the outer periphery of said sleeve and said guide carrier;

a needle valve mounted within said guideway for sliding movement between open and closed positions on said needle valve seat, said needle valve defining an annular clearance of a predetermined radial thickness less than around 5 microns between the outer periphery of said needle valve and the inner peripheral surface of said sleeve forming said guideway; and means to supply fuel to said fuel passageway for cooling of said sleeve and said needle valve.

8. In a fuel injection system for a multi-cylinder internal combustion engine;

an injector having an elongate body with a nozzle adjacent one end thereof for providing fuel to a cylinder of the internal combustion engine;

a needle valve mounted within said elongate body for sliding movement;

a fuel chamber at one end of said needle valve adjacent said nozzle;

a control fluid chamber at the other opposite end of said needle valve;

a fuel passage in said injector body for the supply of fuel to said fuel chamber;

a pressurized control fluid passage in said injector body for the supply of a pressurized control fluid to said control fluid chamber;

a valve seat in said fuel chamber adjacent said nozzle with said needle valve moving between seated and unseated positions relative to said valve seat in response to a predetermined pressure differential between the fuel in said fuel chamber and the control fluid in said control fluid chamber;

a pressure regulator for said control fluid;

a microprocessor providing an output signal for said pressure regulator for varying the pressure of said control fluid in response to operating conditions of the internal combustion engine;

a plurality of sensors for predetermined operating parameters of said engine providing input signals to said microprocessor whereby the pressure of said control fluid is varied according to predetermined operating parameters of said engine, said engine being a diesel engine and the operating parameters of said engine being sensed by said sensors include the air intake pressure, the air intake temperature, the exhaust gas temperature, the combustion chamber temperature, and the rotational speed of the crankshaft; and a separate removable guide sleeve mounted in said elongate body and receiving said needle valve therein for sliding movement, said needle valve and said sleeve defining an annular space therebetween in fluid communication with said control fluid chamber; said control fluid filling said annular space and contacting the opposed surfaces forming said annular space in a capillary action to provide a high fluid tension effect along said opposed surfaces thereby to center said needle valve and prevent the penetration of heavy diesel fuels within the annular space.

9. In a fuel injection system for a multi-cylinder internal combustion engine:

an injector having an elongate body with a nozzle adjacent one end thereof for providing fuel to a cylinder of the internal combustion engine;

a needle valve mounted within said elongate body for sliding movement;

a fuel chamber at one end of said needle valve adjacent said nozzle;

a control fluid chamber at the other opposite end of said needle valve;

a first fuel passage in said injector body for the supply of fuel to said fuel chamber for combustion in said engine;

a control fluid passage in said injector body for the supply of a control fluid to said control fluid chamber;

a valve seat in said fuel chamber adjacent said nozzle with said needle valve moving between seated and unseated positions relative to said valve seat in response to a predetermined pressure differential between the fuel in said fuel chamber and the control fluid in said control fluid chamber;

a second fuel passage in said injector body receiving a continuous flow of fuel during operation of said engine for cooling said injector; and means to supply fuel continuously to said first fuel passage for supply to said fuel chamber for combustion and to said second fuel passage for cooling of said injector from a continuous fuel flow.

10. In a fuel injector system as set forth in claim 9;

said second fuel passage being positioned adjacent said needle valve for cooling of said needle valve.

11. In a fuel injector system as set forth in claim 10;

a sleeve within said injector body receiving said needle valve for sliding movement, said second fuel passageway being positioned adjacent said sleeve for cooling of said sleeve and said needle valve.

12. A fuel injector adapted for use with a fuel injector system for a multi-cylinder internal combustion engine having a predetermined fluid control and pressurized fuel supply comprising:

an elongate injector body having a fuel nozzle at an inner end thereof for projecting within an associated cylinder combustion chamber for delivery of fuel therein, a fuel chamber adjacent the fuel nozzle, a valve seat between the fuel chamber and the fuel nozzle, and a valve guideway having an inner end adjacent the fuel chamber;

a valve having a main body mounted within said guideway for sliding movement and an inner end for seating on said valve seat in a closed position, and a control fluid chamber adjacent the outer end of said guideway with said valve having its outer end in fluid communication with said fluid chamber;

a fuel passage in said injector body extending to said fuel chamber for providing pressurized fuel to the fuel chamber for urging said valve toward open position for opening of the valve to provide fuel to the fuel nozzle; and a fluid control passage in said injector body extending to said fluid chamber for providing control fluid to said control fluid chamber for normally urging said valve into seated closed position, said valve moving to open position upon the reaching of a predetermined fluid pressure differential between said fuel and said control fluid and reseating upon a predetermined reduction of said pressure differential;

said control fluid in said control fluid chamber providing a continuous fluid seal between said valve and said guideway and cushioning the movement of said valve to an open position.

13. The fuel injector as set forth in claim 12 wherein the urging of said valve to closed position on said valve seat is solely from the fluid control pressure in said control fluid chamber.

14. The fuel injector as set forth in claim 12 wherein a mechanical mode spring is provided in said elongate body for selectively acting against said valve for urging said valve to closed position on said valve seat; and means maintain said mechanical mode spring in an inoperable position during operation of said injector from the fluid control pressure in a primary mode of operation.

15. The fuel injector of claim 14 wherein means are provided in said injector body responsive to a decrease in pressure of said control flow below a predetermined minimum amount for activating said mechanical mode spring to urge said valve to seated closed position on said valve seat.

16. An improved fuel injector adapted for use with a fuel injector system having a fluid control pressure source and a pressurized fuel source; said fuel injector comprising:

an elongate body having a longitudinally extending bore therein and defining a longitudinally extending guideway;

a fuel nozzle at an inner end of said body for discharging fuel therefrom;

a fuel chamber positioned between the fuel nozzle and the inner end of said guideway;

a valve seat between the fuel nozzle and the fuel chamber;

a needle valve having a generally cylindrical main body mounted within said guideway for sliding movement between open and closed position on said valve seat and having an inner end exposed to pressurized fuel in said fuel chamber, said needle valve defining an annular clearance between the needle valve and the bore of said body;

a fluid control chamber adjacent the outer end of said guideway and having pressurized control fluid therein exposed to the outer end of said needle valve for urging said needle valve toward a closed seated position on said valve seat, said valve moving to an unseated position upon the reaching of a predetermined fluid pressure differential between said fuel and said control fluid and reseated upon a predetermined reduction of said pressure differential, said pressurized control fluid in said fluid chamber providing a continuous fluid seal between said valve and said guideway for cushioning the movement of said valve to an unseated open position and preventing the penetration of contaminated heavy fuels in the annular clearance between said needle valve and guideway.

17. The improved fuel injector as set forth in claim 16 wherein a separate sleeve is inserted within said elongate body to form said guideway, said sleeve being removable from said body to permit replacement thereof.

18. The improved fuel injector as set forth in claim 17 wherein said annular clearance between the guideway formed by said sleeve and said needle valve has a generally uniform radial thickness of 2–5 microns.

19. The improved fuel injector as set forth in claim 18 wherein said control fluid is a lubricating oil and provides a fluid surface tension effect against the opposed surfaces of said needle valve and sleeve forming said annular clearance.

20. An improved fuel injector adapted for use with a fuel injector system having a fluid control pressure source and a pressurized fuel source; said fuel injector comprising:

an elongate body having a longitudinally extending bore therein and defining a longitudinally extending inserted guideway;

a fuel nozzle at an inner end of said body for discharging fuel therefrom;

a fuel chamber positioned between the fuel nozzle and the inner end of said inserted guideway;

a valve seat between the fuel nozzle and the fuel chamber;

a valve having a generally cylindrical main body mounted within said inserted guideway for sliding movement between open and closed position on said valve seat and having an inner end exposed to pressurized fuel in said fuel chamber;

a control fluid chamber adjacent the outer end of said guideway and having a control fluid pressure therein exposed to the outer end of said valve for urging said valve toward a closed seated position on said valve seat, said valve moving to an unseated position upon the reaching of a predetermined fluid pressure differential between said fuel and said control fluid and reseated upon a predetermined reduction of said pressure differential, said control fluid pressure in said fluid chamber providing a continuous fluid seal between said valve and said guideway and cushioning the movement of said valve to an unseated open position;

a mechanical compression spring in said body bore outwardly of said valve and guideway; and a lost motion connection between the valve and the inner end of the spring to permit movement of said valve between open and closed positions relative to said spring for a fluid control mode of operation of said valve.

21. The fuel injector as set forth in claim 20 wherein a piston mounted within said body is operatively connected to said lost motion connection and responsive to control fluid pressure for maintaining said lost motion connection operable when said control fluid pressure is above a predetermined minimal amount, said piston being actuated upon a decrease in the operating fluid pressure below said predetermined minimal amount of deactivate said lost motion connection and permit said compression spring to urge said valve toward seated position for operation of said valve against the loading of said spring in a mechanical spring mode of operation.

22. The fuel injector as set forth in claim 21 wherein said piston is responsive to a separate fluid control pressure for overriding said lost motion connection and urging said valve to seated position to maintain said valve is a closed shutdown position.

23. The fuel injector as set forth in claim 22 wherein a spindle extends between the outer end of said valve and the inner end of said compression spring, said spindle having its inner end normally spaced from said valve to permit movement of said valve relative to said spindle;

said piston having a mode control rod extending inwardly therefrom and connected adjacent its inner end to said spindle, said piston and said mode control rod holding said spindle out of contact with said rod when said operating fluid pressure is above a predetermined amount and permitting said spindle to contact said valve when said operating fluid pressure is below a predetermined amount.

24. A fuel injector adapted for use with a fuel injection system having a fluid control pressure source and a pressurized fuel source; said fuel injector comprising:

an elongate body having a longitudinally extending bore therein and defining a longitudinally extending inserted guideway;

a fuel nozzle at an inner end of the body for discharging fuel therefrom;

a fuel chamber positioned between the fuel nozzle and the inner end of said guideway;

a valve seat between the fuel nozzle and the fuel chamber;

a valve having a generally cylindrical main body mounted within said guideway for sliding movement between open and closed positions on said valve seat and having an inner end exposed to pressurized fuel in said fuel chamber;

a mechanical compression spring in said body bore outwardly of said valve and said guideway;

a spindle between the outer end of said valve and the inner end of said compression spring and urged by said spring toward said valve member;

a piston responsive to fluid control pressure mounted within said body bore and having a mode control rod secured thereto and extending to said spindle; and a lost motion connection between the inner end of said mode control rod and said spindle, said piston and mode control rod being responsive to a fluid control pressure greater than a predetermined minimum amount to engage said spindle and hold said spindle and spring out of engagement with said valve to permit movement of said valve between open and closed positions relative to said compression spring, said piston and control rod upon a decrease in fluid control pressure below a predetermined minimum permitting said spindle to contact said valve under urging from such compression spring for operation of said valve under the influence of said mechanical spring.

25. A fuel injector as set forth in claim 24 wherein a lost motion connection is provided between the outer end of said spindle and the inner end of said mode control rod to permit movement of said valve and said spindle under the influence of said spring relative to said mode control rod when said spindle is in engagement with said valve upon the fluid control pressure reaching the predetermined minimum amount.

26. A fuel injector as set forth in claim 18 wherein an adjusting screw is threaded within said bore inwardly of said piston and engages the outer end of said compression spring for retaining said spring, said adjusting screw having a central bore therethrough receiving said mode control rod.

27. A fuel injector as set forth in claim 25 wherein said piston is responsive to a second fluid pressure acting on a side of said piston opposite said first mentioned fluid pressure for overriding both the fluid operation and spring operation of said valve, and urging said spindle into contact with said valve to hold said valve in a closed shutdown position.

28. An improved fuel injector system as set forth in claim 3 wherein said sleeve has an outer periphery exposed to fuel flowing therealong for cooling said sleeve and said needle valve.

29. An improved fuel injection system as set forth in claim 4 wherein a fuel chamber is provided adjacent said one end of said guideway between the guideway and said fuel nozzle in continuous fluid communication with said fuel supply means; and a control fluid chamber is provided adjacent said opposite end of said guideway in continuous fluid communication with said control fluid supply means.

30. An improved fluid injection system as set forth in claim 5 wherein said mode control piston is actuated upon a predetermined minimal control fluid pressure to remove any lost motion in said lost motion connection and permit said valve to be urged toward closed position by said mechanical mode spring in the secondary mode of operation.

31. An improved fuel injection system as set forth in claim 5 wherein said mechanical mode spring comprises a compression spring mounted in the bore of said elongate body; and a spindle is mounted between said valve and said compression spring, said mode control rod being connected to said spindle with said spindle including said lost motion connection between said valve and said mechanical mode spring.

32. A fuel injection system for operating a fuel injector for a multi-cylinder internal combustion engine in a primary fluid control mode and alternatively in a secondary mechanical spring mode in the event of a decrease in the operating fluid control pressure below a predetermined minimum; said system comprising:

a high pressure fuel line connected to said fuel injector;

a fuel pump for supplying pressurized fuel to said fuel injector through said high pressure fuel line for delivery into an associated cylinder combustion chamber;

a main fluid supply line to said fuel injector;

a fluid reservoir and an associated pressure accumulator for maintaining the control fluid under a predetermined pressure;

an engine driven fluid control pump in fluid communication with said reservoir for supplying pressurized control fluid to said fuel injector through said main supply line for operation thereof in a primary fluid control mode;

an auxiliary air operated pump in fluid communication with said reservoir and said main fluid supply line;

a shuttle valve between said air operated pump and said engine driven fluid pump blocking supply of control fluid from said air operating pump when said engine driven fluid control pump is supplying control fluid at a predetermined minimal fluid pressure;

means for sensing the fluid control pressure in said main control fluid supply line; and means responsive to said sensing means when the control fluid supplied to said fuel injector reaches a predetermined minimal amount to stop the supply of control fluid to said fuel injector from said engine driven fluid control pump and from said auxiliary air operated pump.

33. A fuel injection system as set forth in claim 32 wherein said sensing means comprises a pressostat in fluid communication with said main control fluid supply line.

34. A fuel injection system as set forth in claim 32 wherein a source of pressurized air has an air supply line connected to said air operated pump for supplying air thereto for operation of said pump, and a solenoid operated valve positioned in said air supply line in an open position during normal operation, said solenoid operated valve being responsive to said sensing means and moving to a closed position upon the operating control fluid reaching a predetermined minimal amount.

35. A fuel injection system as set forth in claim 32 wherein a servomotor is connected to said engine driven fluid control pump and switches said engine driven fluid control pump to a bypass position for return of control fluid to the reservoir upon the operating control fluid in said main supply line reaching a predetermined minimal amount.

36. An improved fuel injection system for a multi-cylinder internal combustion engine comprising:

a fuel injector having an elongate body with a bore therein defining a guideway, a fuel chamber adjacent the inner end of said guideway, and a control fluid chamber adjacent the outer end of said guideway;

a fuel discharge nozzle adjacent the inner end of said elongate body in fluid communication with said fuel chamber, a valve seat between the fuel chamber and said fuel discharge nozzle, and a valve mounted within said guideway for reciprocal movement between seated closed position and unseated open position relative to said valve seat;

a main control fluid supply line extending to said injector and said control fluid chamber;

a fuel pump in fluid communication with said fuel chamber for supplying pressurized fuel to said fuel chamber;

a primary engine driven fluid control pump in fluid communication with said main control fluid supply line for supplying pressurized control fluid to said control fluid chamber;

a secondary independent air operated pump in fluid communication with said control fluid chamber for supplying fluid control pressure to said control fluid chamber when said primary engine driven control fluid pump is inoperable; and shuttle valve means in said main control fluid supply line permitting supply of control fluid to said main supply line from said secondary air operated pump only when said primary engine driven control fluid pump is inoperable and not providing pressurized control fluid to said main supply line.

37. An improved fuel injection system as set forth in claim 36 wherein means are provided for sensing the fluid control pressure in said main control fluid supply line; and means responsive to said sensing means when the control fluid reaches a predetermined low amount for stopping the supply of pressurized control fluid to said injector from said primary engine driven control fluid pump and from said secondary air operated pump.

38. An improved fuel injection system as set forth in claim 37 wherein;

a source of compressed air has an air supply line connected to said air pump for operation of said pump, and a solenoid operated valve is positioned in said air supply line in an open position during a fluid control mode of operation, said solenoid operated valve being responsive to said sensing means and moving to a closed position for stopping said air operated pump upon the operating fluid control pressure in said main supply line reaching a predetermined minimal amount.

39. The improved fuel system as set forth in claim 6 wherein sensing means are provided to sense selected operating conditions of said engine;

and separate fluid control pressure means responsive to said sensing means is actuated upon said operating conditions being outside predetermined parameters thereof to supply control fluid pressure to an opposite side of said mode control piston for overriding the primary fluid control mode of operation and said secondary mechanical mode spring operation for urging said spindle into contact with said valve to hold said valve in a closed shutdown position.

40. In a fuel injection system for a multi-cylinder internal combustion engine; an improved fuel injector comprising:

an elongate body having a needle valve guide carrier adjacent an end thereof defining a needle valve seat and a fuel chamber adjacent the needle valve seat;

a guide sleeve mounted within said guide carrier and defining a central guideway therein positioned adjacent said fuel chamber, said guide carrier having a central bore therein receiving said sleeve and defining a fuel passageway between said sleeve and said guide carrier; and a needle valve mounted within said guideway for sliding movement between open and closed positions on said needle valve seat, said needle valve defining an annular clearance of a predetermined radial thickness less than around 5 microns between the outer periphery of said needle valve and the inner periphery surface of said sleeve forming said guideway.

41. In a fuel system as set forth in claim 7;

said sleeve having a plurality of longitudinally extending grooves along its outer periphery for defining said fuel passageway.

42. In a fuel system as set forth in claim 7 wherein valve means provide for the continuous supply of fuel to said injector during operation of the associated internal combustion engine, said means supplying fuel to said fuel chamber and said fuel passageway adjacent said sleeve.

43. In a fuel injection system for a multi-cylinder internal combustion engine;

an injector having an elongate body with a nozzle adjacent one end thereof for providing fuel to a cylinder of the internal combustion engine;

a needle valve mounted within said elongate body for sliding movement;

a fuel chamber at one end of said needle valve adjacent said nozzle;

a control fluid chamber at the other opposite end of said needle valve;

a first fuel passage in said injector body for the supply of fuel to said fuel chamber for combination in said engine;

a control fluid passage in said injector body for the supply of a control fluid to said control fluid chamber;

a valve seat in said fuel chamber adjacent said nozzle with said needle valve moving between seated and unseated positions relative to said valve seat in response to a predetermined pressure differential between the fuel in said fuel chamber and the control fluid in said control fluid chamber;

a pressure regulator for said control fluid;

a microprocessor providing an output signal for said pressure regulator for varying the pressure of said control fluid in response to operating conditions of the internal combustion engine;

a plurality of sensors for predetermined operating parameters of said engine providing input signals to said microprocessor whereby the pressure of said control fluid is varied according to predetermined operating parameters of said engine;

a second fuel passage in said injector body receiving a continuous flow of fuel during operation of said engine for cooling said injector; and means to supply fuel continuously to said first fuel passage for supply to said fuel chamber for combustion and to said second fuel passage for cooling of said injector from a continuous fuel flow.

44. In a fuel injection system as set forth in claim 8;

said control fluid being a lubricating oil.

45. In a fuel injection system as set forth in claim 8;

a fuel passage between said sleeve and said injector body; and means to supply fuel continuously to said injector during operation of said engine, said fuel being supplied to said fuel chamber and to said fuel passage between said sleeve and said injector body for cooling said sleeve.

46. In a fuel injection system as set forth in claim 45;

said sleeve having a plurality of longitudinally extending grooves along its outer periphery to define said fuel passage between said sleeve and said injector body.

*47. A fuel injector for an internal combustion engine, comprising:*

*a body having a bore extending therethrough defining a guideway for mounting a valve therein;*

*a fuel nozzle in said body for delivering fuel to a combustion chamber, a fuel chamber adjacent said fuel nozzle for holding pressurized fuel therein, and a valve seat between said fuel nozzle and fuel chamber;*

*a valve mounted within said guideway of said bore and movable between opened and closed positions relative to said valve seat, said valve communicating with pressurized fuel in said fuel chamber and being urged toward an open unseated position by said pressurized fuel to allow discharge of fuel through the fuel nozzle; and*

*a pressurized control fluid chamber within said body for holding pressurized control fluid, said control fluid communicating with said valve and urging said valve towards a closed position on said valve seat to block the discharge of fuel through said nozzle; and*

*an annular space between the needle valve and the guideway of the body, the space being in fluid communication with the control fluid chamber and said control fluid providing a fluid seal and lubrication between the guideway and the needle valve.*

*48. The fuel injector of claim 47 wherein the bore defining a guideway for mounting a valve further comprises:*

*a needle valve guide carrier within a guide sleeve mounted therein to define a central guideway the needle valve being mounted slidably within the guideway sleeve, the guide sleeve having fuel supply lines for supplying fuel to the fuel chamber and for cooling of the sleeve during operation of the fuel injector.*

*49. A fuel injector for an internal combustion engine, comprising:*

*a body having a bore extending therethrough and defining a guideway;*

*a fuel nozzle at an inner end of said body for discharging fuel therefrom;*

*a fuel chamber positioned between the fuel nozzle and the inner end of said guideway;*

*a valve seat between the fuel nozzle and the fuel chamber;*

*a needle valve slidably mounted within said guideway to allow movement between opened and closed positions on said valve seat, the needle valve defining an annular clearance between the needle valve and the guideway of said body; and*

*a fluid control chamber adjacent said guideway for containing pressurized control fluid therein for providing a continuous fluid seal between said valve and said guideway to prevent the penetration of fuels into the annular clearance between said needle valve and guideway.*

*50. The fuel injector of claim 49 wherein the guideway further comprises fuel supply lines for supplying fuel to the fuel chamber and for cooling.*

*51. A fuel injection system for an internal combustion engine, comprising:*

*an injector having a body with a nozzle at one end thereof for providing fuel to an internal combustion engine;*

*a needle valve mounted slidably within said body;*

*a fuel chamber at one end of said needle valve;*

*a fuel passage for supplying fuel to said fuel chamber;*

*a control fluid chamber adjacent the opposite end of said needle valve;*

*a control fluid passage for supplying of a control fluid to said control fluid chamber;*

*a valve seat in said fuel chamber adjacent said nozzle within said needle valve slidably movable between seated and unseated positions relative to said valve seat in response to a pressure differential between the fuel in said fuel chamber and the control fluid in said control fluid chamber;*

*an annular space between the needle valve and the injector body, the space in fluid communication with the control fluid chamber and said control fluid providing lubrication and preventing the penetration of fuels within the annular space; and*

*means for controlling the pressure of the control fluid in response to operating conditions of the engine.*

*52. The fuel injection system of claim 51 further comprising a mechanical spring disposed in said body for urging said needle valve to a closed position on said valve seat; and*

*means for maintaining the mechanical spring in an operative position during operation of the injector in response to the pressure differential between the fuel chamber and control fluid chamber.*

*53. The fuel injection system of claim 51 wherein the body of the injector further comprises a needle valve guide carrier with a guide sleeve mounted therein to define a central guideway, the needle valve being mounted slidably within the guideway sleeve, the guide sleeve having fuel supply lines for supplying fuel to the fuel chamber and for cooling of said sleeve.*

* * * * *